United States Patent [19]

Telymonde et al.

[11] Patent Number: 5,555,120

[45] Date of Patent: Sep. 10, 1996

[54] CORDLESS CONTROL SYSTEM FOR AN X-RAY APPARATUS

[76] Inventors: Timothy D. Telymonde, 75 Manchester Ave., Keyport, N.J. 07735; Andrew Telymonde, 48 Island Dr., Brick, N.J. 08724

[21] Appl. No.: 336,989

[22] Filed: Nov. 10, 1994

[51] Int. Cl.$^6$ .................................................. H04B 10/10
[52] U.S. Cl. ...................... 359/147; 359/142; 359/148; 378/115
[58] Field of Search .................................. 359/142–149; 378/115

[56] References Cited

U.S. PATENT DOCUMENTS

| | | | |
|---|---|---|---|
| 4,074,234 | 2/1978 | Fox | 359/148 |
| 4,170,735 | 10/1979 | Codina | 250/422 |
| 4,225,787 | 9/1980 | Shapiro | 250/406 |
| 4,355,276 | 10/1982 | Vittay | 322/4 |
| 4,544,923 | 10/1985 | Blatter | 359/142 |
| 4,641,374 | 2/1987 | Oyama | 359/144 |
| 5,081,543 | 1/1992 | Romandi | 359/145 |
| 5,191,324 | 3/1993 | Rydel | 359/142 |
| 5,206,894 | 4/1993 | Makrinos | 378/93 |

FOREIGN PATENT DOCUMENTS 0149239  11/1981  Japan ...................... 359/147

OTHER PUBLICATIONS

Trepak, "IR Remote Conrol", Practical Electronics, vol. 18 #2 pp. 32–34, Feb. 1982.

Primary Examiner—Leslie Pascal
Attorney, Agent, or Firm—Patrick J. Pinto

[57] ABSTRACT

A cordless control system for actuating selected functions of a mobile X-ray unit. This cordless control system comprises a transmitter and a receiver. The portable transmitter is hand held and includes a first control switch, a second control switch, and an infrared emitting circuit. The infrared emitting circuit includes a plurality programmable encoding switches. Each of the programmable encoding switches are user switchable for emitting at least one binary coded infrared signal. The receiver includes a plurality of infrared sensors and a receiving circuit. The receiving circuit includes a plurality of programmable decoding switches. Each of the infrared sensors is arrayed for receiving each binary coded signal being sent by the transmitter. The receiving circuit in cooperation with the decoding switches providing actuation of the selected functions only when the plurality of encoding switches and the decoding switches are programmed exactly alike and only when either of the first control switch or the second control switch is manually actuated. The transmitter also includes a distinguishing means to provide sensory indication to the user of an intermediate position of the first control switch.

7 Claims, 3 Drawing Sheets

CORDLESS CONTROL SYSTEM FOR AN X-RAY APPARATUS

BACKGROUND OF THE INVENTION

1. Field of the Invention

With regard to the classification of art, this invention is believed to be found in the general class entitled "X-ray Systems or Devices", and more particularly to the subclasses pertaining to "Electronic Circuits" for controlling functions of a portable X-Ray unit.

2. Description of the Prior Art

X-ray units are well known in the art. Several known U.S. patents disclosing cordless control systems for X-ray units are: U.S. Pat. No. 4,975,937, issued to Horton et al on Dec. 4, 1990, and U.S. Pat. No. 5,206,894 issued to Makrinos et al on Apr. 27, 1993.

U.S. Pat. No. 4,975,937 discloses a head activated flouroscopic control. This unit is primarily designed for use with a stationary base unit. It is specifically to be used in a surgical environment having one flouoscope per surgical suite. A head mounted transmitter is maintained in a powered up condition. This continual powered up arrangement may lead to premature battery drain. This type of control may expose the surgeon to unnecessary radiation.

U.S. Pat. No. 5,206,894 discloses an accessory for an X-ray system. This system uses a single button control which requires two successive actuations in order to perform an exposure. The second actuation must be performed within a specified time period before an exposure can take place. One disadvantage of this accessory is that the operator does not have instantaneous or momentary control of the Prep, and Expose functions of the X-ray unit. The selected time delay for the second actuation of the switch may not allow enough time for the operator to act or the complete rotation of the anode. This type of control may also lead to an excessive drain of the X-Ray units battery. If the time period is extended, the battery drain would be even worse. The U.S. Pat. No. 5,206,894 disclosure also suggest that the unit uses a single signal in two separate actuations to perform the prep and expose functions of the X-ray unit. It is believed that this control arrangement may accidentally actuate a nearby second X-ray unit, having a similar control system, by reflected signals.

It has been determined that there is a need for a cordless remote control which provides instantaneous or momentary control of the various functions of an X-Ray unit. This cordless control must meet regulatory agency requirements while being compatible with existing portable X-ray units. This cordless control should have multiple channels which are user selectable. These multiple channels when properly encoded will allow only one transmitter to operate a single receiving unit. This cordless control must also minimize draining of the batteries in the X-ray unit and the transmitter.

SUMMARY OF THE INVENTION

This invention may be summarized in part with respect to its objects. It is an object of this invention to provide and it does provide a cordless control for a portable X-ray unit. This cordless control features a momentary pushbutton operation which is absent holding, latching or timer circuits.

It is also an object of this invention to provide and it does provide a cordless remote control which has battery conserving circuitry.

It is another object of this invention to provide a cordless remote control unit which easily interfaces with electrical circuits of existing X-ray units.

It is still another object of this invention to provide and it does provide a cordless remote control which will provide an extended range of operation.

It is yet another object of this invention to provide and it does provide a cordless remote control in which the transmitter and the receiver have switches which must have like settings for operation of the X-ray unit to occur.

One aspect of the invention discloses a cordless control system for actuating selected functions of a mobile X-ray unit. This cordless control system comprises a transmitter and a receiver. The portable transmitter is hand held and includes a first control switch, a second control switch, and an infrared emitting circuit. The infrared emitting circuit includes a plurality of programmable encoding switches. Each of the programmable encoding switches being user switchable for emitting at least one binary coded infrared signal. The receiver includes a plurality of infrared sensors and a receiving circuit. The receiving circuit includes a plurality of programmable decoding switches. Each of the infrared sensors being arrayed for receiving each binary coded signal being sent by said transmitter. The receiving circuit in cooperation with said decoding switches providing actuation of the selected functions only when the plurality of encoding switches and the decoding switches are programmed exactly alike and only when either of said first control switch or said second control switch is manually actuated.

In addition to the above summary, the following disclosure is detailed to insure adequacy and aid in the understanding of this invention. This disclosure, however, is not intended to cover each new inventive concept no matter how it may be disguised either by variations in form or additions by further improvements. For this reason, there has been chosen specific embodiments of a cordless control system for a mobile X-Ray apparatus. The specific embodiments have been chosen for the purpose of illustration and description as shown in the accompanying drawings wherein:

Figure 1:
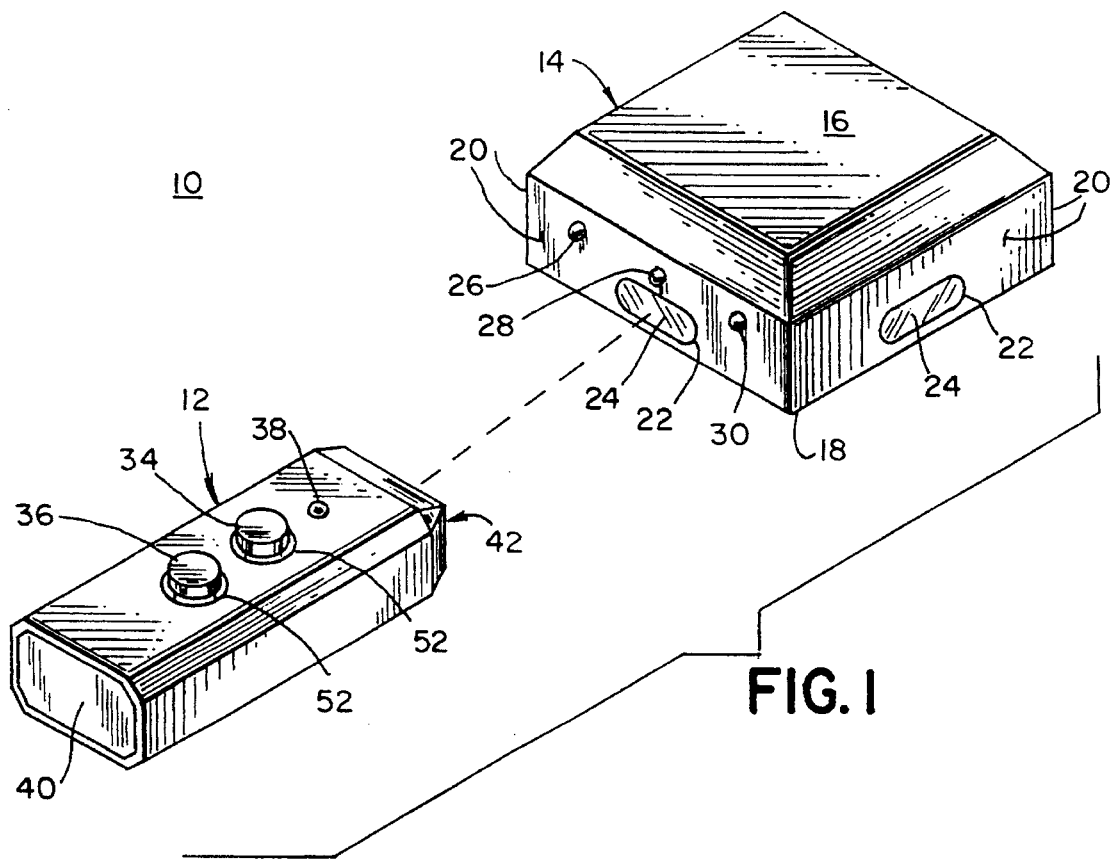
FIG. 1 represents an isometric view of a cordless control system of the present invention. This view showing a receiver unit and a portable hand-held transmitter.

In the following description and in the claims, various details are identified by specific names for convenience. These names are intended to be generic in their application while differentiating between the various details. Corresponding reference characters refer to like members throughout the several figures of the drawings.

The drawing accompanying, and forming a part of this specification disclose details of construction for the sole purpose of explanation. It is understood that structural details may be modified without departing from the concept and principles of the invention. This invention may be incorporated in other structural forms than shown.

DETAILED DESCRIPTION OF THE INVENTION

Referring to FIG. 1, a control system is generally identified as 10. The control system 10 includes a transmitter 12 and a receiver unit 14. The receiver unit 14 has a top 16, a bottom 18, and sides 20. The preferred receiver has four sides 20. Preferably, each of the sides 20 has a through aperture 22 for mounting an infrared sensor 24. The mounting of infrared sensors 24 in each side 20 provides 360 degrees of sensor coverage. At least one side 20 has a "Prep" signal indicator 26, an "Expose" signal indicator 28, and a "Collimator" signal indicator 30. It is preferred that indicators 26, 28, and 30 be of the LED type. It is also preferred that the indicator lamps have distinguishing colors. For example the Prep lamp 26 may be green, the Expose lamp 28 may be yellow and the Collimator lamp 30 may be red. The use of LED type indicator lamps minimizes the current draw on the X-ray units battery. Of course other types of lamps may be used which would minimize battery drain. Preferably, the receiver 14 is physically and electrically attached to the X-ray unit. The receiver is connected in parallel with the X-ray units own corded control system. The receiver is small in size (12.7 cm×12.7 cm×5.0 cm), therefore it may be mounted on any surface of the X-ray unit which would allow 360 degree of sensing range along a substantially horizontal plane.

The transmitter 12 is battery powered and designed for hand-held operation. The housing 32 of the transmitter is contoured for grasping by one hand of the user. The transmitter includes a first control switch 34, a second control switch 36, a signal transmit indicating lamp 38, a battery compartment 40, and an infrared signal emitter 42.

Figure 2:
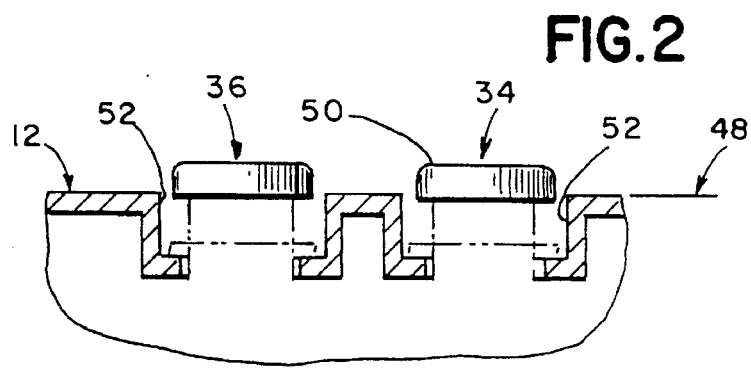
FIG. 2 represents a fragmentary side elevational view, partly diagrammatic and partly in section, of a preferred mounting arrangement of first control switch and a second control switch.
Figure 3:
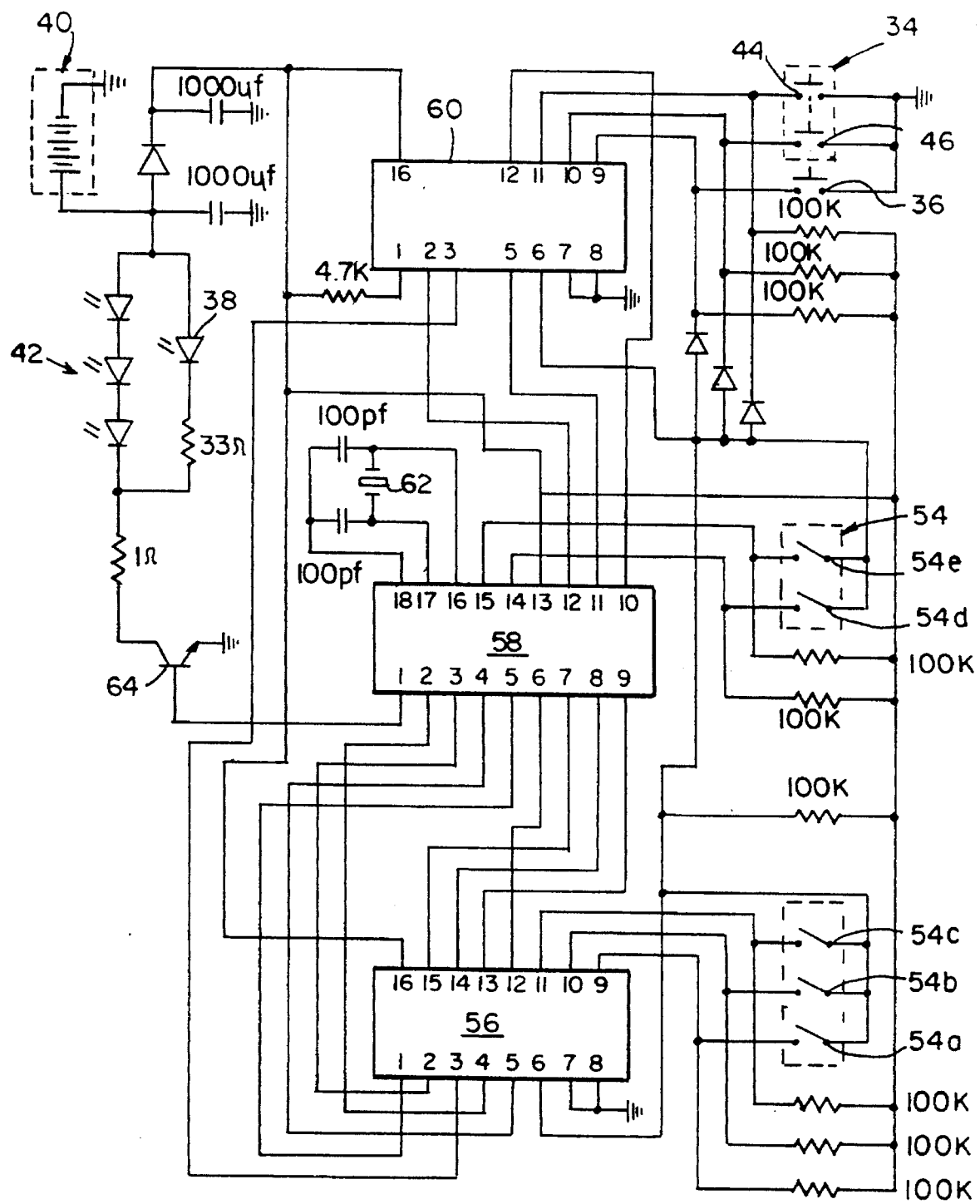
FIG. 3 represents an electrical schematic of a preferred circuit for the transmitter.

Referring now to FIG. 2, a preferred mounting arrangement is shown for the first control switch 34 and the second control switch 36. It is important to note that the first switch 34 is a three position switch, meaning it has an OFF position, an INTERMEDIATE position for closing a first set of contacts 44, and a LOWER position which closes a second set of contacts 46 while maintaining the first set of contacts 44 in a closed position. Contacts 44 and 46 may be more clearly seen in FIG. 3.

Referring again to FIG. 2, a preferred arrangement is shown, for distinguishing between the INTERMEDIATE position and the LOWER position. Normally the surface 50 of the head of the first control switch is above the surface 48 of the transmitter housing. This raised position would be the OFF position. As the head of the control switch 34 is depressed so that the surface 50 is near alignment with the surface 48, the first set of contacts 44 closes, emitting a first binary coded signal (PREP). The LOWER position, meaning that the surface 50 is below the surface 48, closes the contacts 46 in addition to contacts 44. This LOWER position would emit a second binary encoded signal (EXPOSE). These contacts 44 and 46 are momentary contacts, meaning that release of the switch will open the contacts.

The second control switch 36 controls only the Collimator function of the X-ray unit, therefore it may be of a single pole double throw momentary type. While a preferred arrangement for mounting the first control switch 34 and second control switch 36 shows each switch being mounted in a counterbored aperture 52. It is anticipated that a circular or semi-circular ring may be formed around the switches. These rings would protrude a selected distance above surface 48 to provide a sensory indication of the intermediate positioning of switch 34. Other sensory indications may include a two stage biasing means within the switch 34..

This biasing means would provide a noticeable difference in the force resisting movement of the switch from its INTERMEDIATE position to its LOWER position.

Referring again to FIG. 3, the preferred transmitter circuit is powered by a 9 VDC battery, which is carried in compartment 40. It is preferred that most of the components of the transmitter circuit be mounted on a printed circuit board. The components of the transmitter circuit includes a multiposition DIP switch 54. This DIP switch 54 is shown as having 5 positions. The DIP switch 54 has also been shown as two separated blocks for ease of illustration. Three of the five positions are connected to binary input terminals of a single eight channel multiplexer 56. One example of a single eight channel multiplexer 56 is a CD4051B. The combination of ON and OFF settings for switch contacts 54(a); 54(b); and 54(c) result in 8 distinct outputs from multiplexer 56. These eight outputs are connected to the ROW select terminals of a Pulse Position Modulation (PPM) Transmitter 58. One example of a PPM Transmitter is identified as a MV500. Switch contacts 54(d) and 54(e) are connected to the Rate Input terminals of the PPM Transmitter 58. One or both of these contacts 54(d) and 54(e) must be in the ON condition to allow the PPM Transmitter 58 to power up. The logic of the circuitry will not allow the PPM Transmitter 58 to transmit a binary code if all of the contacts 54(a) through 54(d) are in an OFF condition. This arrangement means that an X-ray unit will not be remotely operated if all of the switch contacts are in an OFF condition.

The contacts of the first control switch 34 and second control switch 36 are connected to the binary input terminals of a second Multiplexer 60, which is similar to Multiplexer 56. The outputs of the Multiplexer 60 are connected to the COLUMN select terminals of the PPM Transmitter 58. This selectable combination of COLUMN, ROW, and RATE INPUT provide at least 72 binary codes to be transmitted over 24 channels. This means that 24 separate X-Ray units, having distinct settings of the DIP switches, could be independently operated in the same room. A 500kHz crystal Resonator 62 is connected to the Oscillator terminals of the PPM transmitter 58. This Resonator 62 is the source for the timing rates of the binary code. As an example: If switch 54(d) is closed and switch 54(e) is open, a FIRST rate value (clock cycles) is 2048; If switch 54(d) is closed and switch 54(e) is open, a SECOND rate value (clock cycles) is 1024; and if both switches 54(d) and 54(e) are closed a THIRD rate value (clock cycles) is 512. As previously mentioned when both switches 54(d) and 54(e) are simultaneously open, a rate value is inhibited. The output terminal of the PPM transmitter 58 is connected to a transister 64. One example of a preferred transister is a ZTX749. The output of the transmitter 64 drives the LED emitter diodes 42 and the transmit indicating lamp 38. The other components of the circuit are identified in a conventional manner.

The transmitter circuit as described above remains in a power down mode until either of the contacts of the first control switch 34 or second control switch 36 are closed by an operator or technician. Upon release of the first control switch 34 or the second control switch 36, the transmitter circuit returns to its power down mode.

Figure 4:
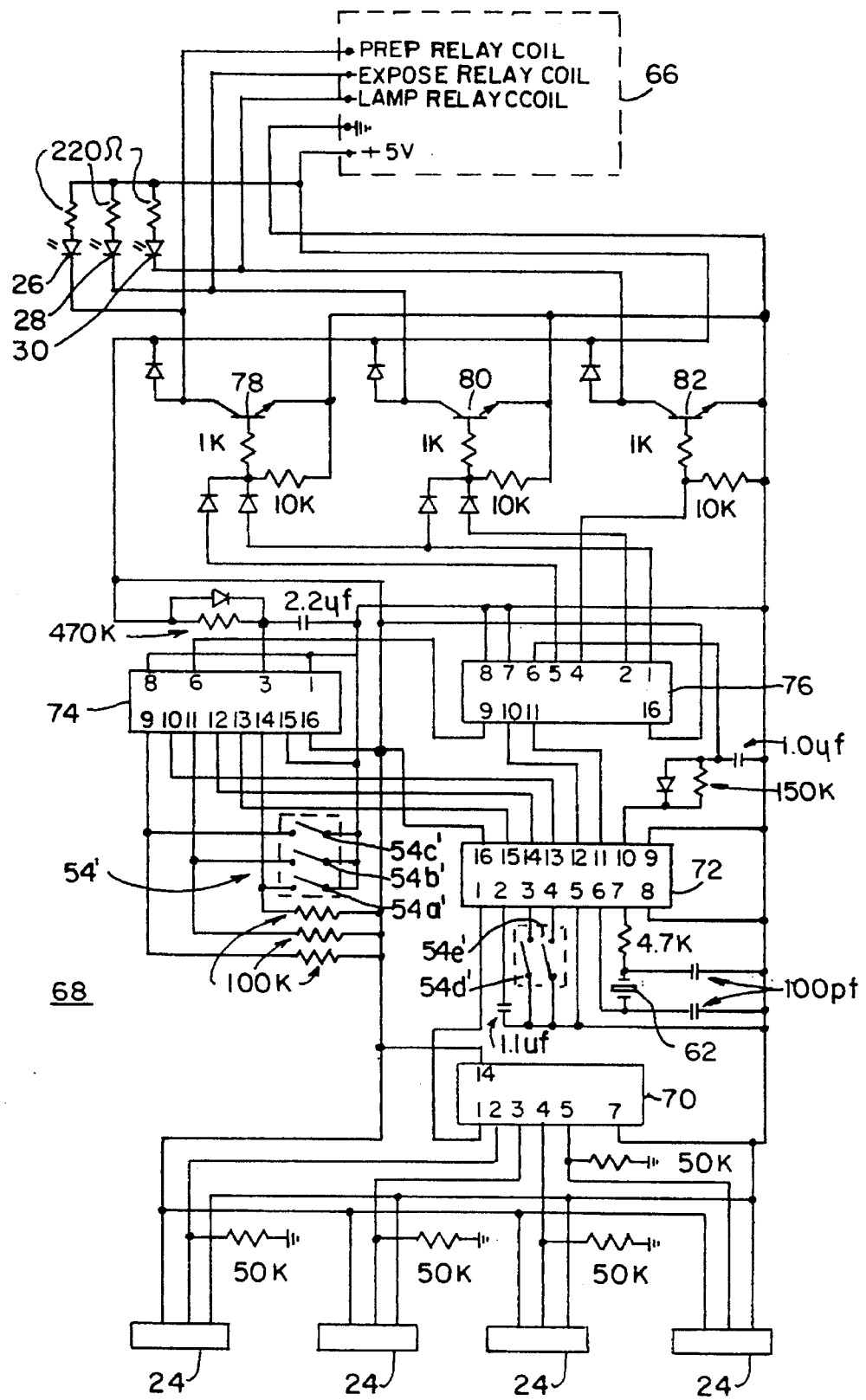
FIG. 4 represents an electrical schematic of a preferred circuit for the receiver unit.

Now referring to FIG. 4, a schematic for the receiver 14 circuit is shown. This schematic includes a power supply and control relay section 66; a control logic section 68; and a plurality of infrared sensor and pre-amplifier sections 24. The power supply and control relay section 66 interfaces between the power source from the X-ray unit and the logic section 68. This section preferably is capable of input power voltage supplies between the range of 9–24 VDC or 7–18

VAC. The output voltage of this section 66 is 5 VDC. This section 66 also includes three individual control relays, not shown. The three relays are adapted for having their contacts operate in parallel with the PREP, EXPOSE, and COLLIMATOR LAMP circuits of the X-ray unit. The coils of the three relays are connected to the plurality of outputs of the logic section 68.

It is preferred that each of the infrared sensor sections 24 include a pre-amplifier circuit which is shielded and adapted for providing inputs to a 4 input Dual Nand Gate 70. One example of Nand Gate 70 is a MC14012B. The binary signal or word is directed from the Nand Gate 70 to an input terminal of a Pulse Position Modulation (PPM) Remote Control Receiver 72. One example of a PPM Receiver 72 is a MV601. The rate input terminals of the PPM Receiver are connected to switch contacts 54(*d*)' and 54(*e*)' of a five position DIP switch array 54 '. A crystal Resonator 62' must be of the same type as Crystal Resonator 62, described above. When the Contacts 54(*d*)' and 54(*e*)' have exactly the same settings as the Transmitter DIP switch contacts 54(*d*) and 54(*e*); the output of the PMP Receiver will be set to the Rate Value of the binary word being transmitted by the PPM Transmitter 64. If the Rate Value settings are the same, the outputs pins 13–15 send the first three bits of the binary signal or word to a 4 Bit Magnitude Comparator 74. One example of the Comparator 74 is a MC74NC85. The three bits of the binary word are compared with the code programmed by the DIP switches 54(*a*)'; 54(*b*)'; and 54(*c*)' which are connected to pins 14; 11 and 9 of the Comparator 74. When the settings of the DIP switches 54(*a*)'; 54(*b*)'; and 54(*c*)' are exactly matched to the settings of the Transmitter DIP switches 54(*a*); 54(*b*); and 54(*c*), the output from Comparator 74 enables a CMOS analog Multiplexer/De-multiplexer 76. One example of the Multiplexer/De-multiplexer 76 is a CD4051B. The enabled Multiplexer/De-multiplexer 76 can then decode the last two bits of the binary word received from the PMP Receiver 72.

When all of the individual contacts of the DIP switches 54 and 54' are set exactly alike, the multiplexer/De-multiplexer 76 turns on the appropriate transistor or transistors 78, 80, and 82. For example when the PREP binary word is decoded, only transistor 78 is turned on. When the Expose binary word is received transistors 78 and 80 are turned on simultaneously. When the COLLIMATOR LAMP binary signal is received, only transistor 82 is turned on. Transistor 78 energizes the coil of the PREP control relay and the PREP LAMP 26. Transistor 80 energizes the coil of the EXPOSE control relay and the EXPOSE LAMP 28. Transistor 82 energizes the coil of the COLLIMATOR LAMP control relay and the COLLIMATOR LAMP 30. The circuitry shown in FIG. 4 allows both transistors 78 and 80 to be energized simultaneously only when the EXPOSE binary signal is received. This simultaneous energizing of the transistors 78 and 80 energizes both of the PREP relay and the EXPOSE relay and their respective LAMPS 26 and 28. This is accomplished without the use of latching circuitry. Meaning instantaneous or momentary control of the PREP; EXPOSE; and COLLIMATOR functions is attained. The balance of the components of the control logic section 68 are identified in a conventional manner.

This receiver circuit, as shown in FIG. 4, uses minimum power when not receiving a binary code. This is important when the X-ray unit is battery powered, because the power down feature minimizes battery drain.

The cordless remote control system described above has been experimentally tested and found to have a range in the vicinity of 27.4 M. (30 yds) in open space. This remote control system has also been experimentally tested in a closed environment or room 4.5 M×4.5 M. (15 ft.×15 ft). The receiver 14 responded to signals from the Transmitter 12 from all points within the room. It has also been found that the cordless remote control system of the present invention has a high immunity to interference and crosstalk from a system using one of the other 23 or adjacent channels.

Directional terms such as "left", "right", "up", "down", "bottom", "top", "front", "back", "in", "out", and the like may have been used in the above disclosure. These terms are applicable to the embodiments shown and described in conjunction with the drawings. These terms are merely for the purpose of description and do not necessarily apply to the position in which the cordless remote control system of the present invention may be utilized.

While a particular embodiment of a cordless remote control system has been shown and described, it is to be understood that the invention is not limited thereto and protection is sought to the broadest extent the prior art allows.

What is claimed is:

1. A cordless control system for actuating selected functions of a mobile X-ray unit comprising:

a) a portable hand held transmitter including a first control switch, a second control switch, and an infrared emitting circuit, said infrared emitting circuit including at least one encoding, encoding switch having a plurality of outputs for providing a predetermined combination, said first control switch having an Off position, an Intermediate position, and a Lower position; said Intermediate position transmitting only a first binary coded infrared signal for initiating only a Prep function of a mobile X ray apparatus, said Lower position transmitting only a second binary coded infrared signal for initiating an Expose function of the mobile X ray apparatus while simultaneously maintaining said Prep function, said Prep function and said Expose function being terminated upon manual release of said first control switch, b) a receiver means including at least one infrared sensor and a receiving circuit, the receiving circuit having at least one decoding switch, each decoding switch having a plurality of outputs for providing the predetermined combination, of each of said infrared sensors arrayed for receiving said first binary infrared signal and said second binary coded infrared signal sent by said transmitter, said receiving circuit providing actuation of the selected functions only when said first control switch is manually actuated; and wherein the predetermined combination provides at least one single channel for the binary coded infrared signals, said first binary coded infrared signal and said second binary coded infrared signal being transmitted on the single channel of said cordless control system.

2. A cordless control system as recited in claim 1 wherein said transmitting circuit remains in a power down mode in the absence of manual actuation of said first control switch or said second control switch for minimizing the power consumption from its power supply.

3. A cordless control system as recited in claim 1 wherein said control system remains in a power down mode when all of said encoding switches and decoding switches are placed in an Off position for preventing unwanted operation of an X ray apparatus.

4. A cordless control system as recited in claim 1 wherein each encoding switch and each decoding switch have 5 user switchable contacts for providing at least 72 distinct combinations of binary coded infrared signal over 24 channels.

5. A cordless control system as recited in claim 1 wherein manual activation of said second control switch transmits a third binary coded infrared signal for only activating a collimator lamp function of said X ray apparatus, said collimator lamp function being discontinued immediately upon manual de-activation of said second control switch, said third binary coded infrared signal being transmitted on said single selectable channel.

6. A cordless control system as recited in claim 1 wherein said first control switch includes a position distinguishing means for providing sensory indication to the hand of the user that said first control switch was in the intermediate position.

7. A cordless control system as recited in claim 1 wherein four infrared sensors are arrayed at ninety degrees of arc displacement to each other for detecting said binary coded infrared signal at any point along a path of three hundred and sixty degrees of arc.

* * * * *